3,265,513
CARBON-CONTAINING REFRACTORIES
William A. Tidridge, Fanwood, David Goldstein, Somerset, and Jared S. Sproul, Rahway, N.J., assignors to FMC Corporation, New York, N.Y., a corporation of Delaware
No Drawing. Filed Oct. 17, 1963, Ser. No. 317,044
13 Claims. (Cl. 106—56)

The present invention relates to the production of carbon-bonded refractories for use in oxygen-blown basic steel converters, and more specifically, to the production of pitch-bonded bricks which are converted in use to carbon-bonded refractory liners in air-blown basic Bessemer converters, such as Thomas converters, or top-blown basic oxygen converters.

At the present time, oxygen converters have become increasingly popular for use in steel manufacture because they decrease the time required for steel production and are more easily operated than open hearths. The oxygen converters in current use, which are variants of the bottom-blown basic Bessemer converters, are operated by blowing an oxygen-containing gas into the molten steel through a hollow lance which is located above the melt.

The refractory linings normally used in these oxygen converters are made up of pitch-bonded bricks which contain refractory grains that are made up of dead-burned magnesite or magnesia (MgO), dead-burned dolomite ($CaO \cdot MgO$), or a mixture of the two. The bricks are made up by blending crushed dead-burned dolomite or magnesia, having high densities and low porosities and ranging in particle size from fines to relatively coarse particles, with hot pitch or tar, and pressing the resulting mixture at about 5000–13,000 p.s.i. to form the refractory bricks. The bricks are finished by placing them in position in the furnace liner and then burning coke in the furnace. This "firing-in" treatment converts intergranular bonding tar at the surface of the brick, and extending to a substantial depth within the brick, to elemental carbon and yields a brick containing refractory particles bonded together by elemental carbon.

A most serious problem that has arisen with the use of these carbon-containing refractory bricks is that they are subject to severe and rapid corrosion due to conditions peculiar to the oxygen converters. Initially, the carbon protects the refractory from being wetted, penetrated and attacked by the molten slag in the furnace. However, the carbon is readily oxidized away by the slag and the oxidizing gases which are inevitably found in the converter. The refractory grains are thereby exposed to wetting and corrosion by the melt. This attack on the refractory particles is furthered by the violent swirling motion of the molten steel in the converter, which tends to erode the refractory grains and thereby assist in brick disintegration. Thus, both the intergranular elemental carbon and refractory particles which make up the refractory brick lining are constantly and rapidly corroded during normal use of the converter.

Efforts which have been made to increase the life of these refractory bricks have proceeded along either of two approaches. The first of these is to increase the carbon content of the bricks in order to increase the time required for the slag to penetrate the refractory brick. This approach is set forth in U.S. Patent 3,070,449, issued on December 25, 1962 to Davies et al. in which there is described a process that employs two types of pitch, a bonding pitch and a fine powdered pitch. The powdered pitch has a high softening point and is incorporated along with the refractory grains into a brick which is bonded together by the lower softening point pitch. By means of this technique, the carbon content of the brick is increased from less than about 1.5% to from about 2.1 to 4.2% (from 3–8% pitch to 10–14% pitch by weight of the aggregate in the brick). The use of a fine-powdered pitch is necessary in the above process because the quantity of bonding pitch cannot exceed about 8% by weight of the aggregate; otherwise, excess bonding pitch will yield a weak intergranular structure during the firing-in period; and further, too much bonding pitch yields a wet and sticky mixture during the hot brick pressing operation, causing difficulties in manufacture. While this patented process has been successful in increasing the total carbon content of the refractory bricks, the magnitude of this increase is quite small and thus leaves room for much improvement in extending the life of refractory bricks.

The second approach towards increasing the life of refractory bricks is to fabricate them from refractory grains having minimum porosity. Reducing the porosity of the refractory grains makes penetration of the refractory more difficult and therefore, slows up corrosion. One typical process for reducing grain porosity is taught in U.S. Patent No. 3,074,806, issued to Atlas et al. on January 22, 1963. This patent describes a process for calcining dolomite with the addition of about 0.3 to about 2% by weight of a fluxing agent. By this means, the porosity of the calcined dolomite is reduced to as low as 5.9%. While such low porosity of the grains slows up penetration of the melt into the refractory somewhat, the melt nevertheless readily wets and attacks the refractory grains and therefore, does not obviate the basic corrosion problem.

It is an object of the present invention to produce carbon-bonded refractory bricks which are resistant to corrosion and oxidation and in which the amount of carbon which can be incorporated in the bricks is substantially increased.

We have now found that, contrary to present beliefs, a basic refractory brick which is highly resistant to oxidation and corrosion can be produced by employing refractory grains having increased porosities and preferably, having an open porosity of from about 25% to about 50%. These open-pored refractory grains are treated to deposit substantial quantities of carbon in the pores of the grains, in amounts as high as about 25% by weight of the particle, prior to pressing the grains into bricks with a pitch binder.

When refractory grains having open porosities of from about 25% to about 50% are carbon-impregnated, and the impregnated grains are pressed into bricks with a pitch binder, pitch-bonded refractory bricks can be obtained having a total carbon content of from about 5% to about 25% by weight of the brick.

In this process, the carbon-bonded basic refractory brick is produced by (a) impregnating the pores of porous refractory grains with carbon, preferably those grains having open porosities of from about 25% to 50% and whose pores have effective diameters of from about 5 microns to about 100 microns,
(b) intimately mixing the carbon-impregnated refractory grains with a carbonaceous binder such as a bonding pitch, and
(c) compressing the mixture of carbon-impregnated refractory grains and the carbonaceous binder into predetermined shapes, such as bricks, having increased total carbon contents.

The percent "open porosity" is defined as the volume present in the sample that is penetrable by mercury when treated under pressures over the range of 1.8 to 5,000 p.s.i. absolute. The "effective" diameter of any pore is its smallest diameter through which mercury penetrates in substantially filling the pore.

As a result of this treatment, the resulting carbon-bonded refractories have much more carbon than heretofore could be incorporated in a brick having sufficient strength and other physical properties suitable for use in refractory liners. The increased quantity of carbon is most desirable because it prevents the molten steel and slag from penetrating the refractory and increases the resistance of the refractory to oxidation by increasing the time required to consume the carbon at the melt-brick interface in the furnace.

More importantly however, these refractory bricks have their large carbon contents dispersed throughout the brick as internal webs or ribbons of carbon or pitch that penetrate into the porous structure of each of the refractory grains making up the bricks. As a result, the intragranular carbon that is intimately dispersed within the refractory grain forms a continuous web with the intergranular carbon or bonding pitch that binds together each of the refractory grains in the brick. The complete carbon webs extending throughout the carbon brick and penetrating into the refractory grains, materially increase the resistance to penetration by molten steel and slag into the face of the refractory brick and into the refractory grains of the brick. Further, these carbon webs are highly resistant to being oxidized because the carbon-filled pores of the grains are less accessible to oxidation.

In carrying out the present invention, the refractory grains can be made up of any furnace refractory which will retain its strength at temperatures of from about 1600° C. to 1800° C. Typical examples of these are magnesium oxide, calcined dolomite, alumina, silicon carbide, forsterite, mullite and other well-known refractory materials. The most commonly employed basic refractories are magnesium oxide and calcined dolomite.

The preferred refractories of the present invention are periclased magnesium oxide particles produced as set forth in copending application Serial No. 320,250, filed October 17, 1963, in the name of Kenneth M. Berg and James A. Robertson. These refractory periclase particles have "open porosities" from about 25% to about 50%. The "open porosity" of these refractory particles is of a type in which the pores are accessible to the external surface of the grain so as to permit penetration by a liquid such as fluid pitch with the formation of a more or less continuous or semi-continuous structure throughout the refractory grain. Completely closed pores which cannot be filled or penetrated with a carbonaceous fluid are excluded from the "open porosity" definition.

The percent "open porosity" can be determined readily by using an Aminco-Winslow Porosimeter, manufactured by the American Instrument Co., Inc. of Silver Spring, Maryland, which is designed to permit pressures of up to 5000 p.s.i. absolute to be exerted on mercury used to penetrate pores. In using this technique, the porous sample is first impregnated with mercury under a pressure of 1.8 p.s.i. absolute. At this pressure, the mercury penetrates all voids and surface cracks which are larger than 100 microns. The pressure on the mercury is then increased, up to 5000 p.s.i. absolute, during which increased amounts of mercury penetrate the porous sample. The increase in the volume of mercury which penetrated the sample from 1.8 to 5000 p.s.i. absolute indicates its open porosity.

In addition to the degree of porosity required above, the pores should be of a size which will permit rapid penetration and deposition of carbon, so that inner pore walls can be coated with carbon. In general, it is found that pores having "effective" diameters greater than about 5 microns are readily penetrated by hot pitch thereby allowing carbon to be deposited by carbonizing the pitch. When carbon is introduced by thermal cracking of hydrocarbons, such as methane or propane, within the pores of the grain, pores having effective diameters smaller than about 5 microns are also readily penetrated since the hydrocarbon gas molecules can more quickly penetrate these pores than can hot fluid pitch. Pores having effective diameters smaller than about 5 microns can be impregnated with carbon by either technique, but the time required for carbon impregnation rapidly increases with decreasing pore size and soon reaches commercially unacceptable impregnation times. For this reason, effective pore diameters of above about 5 microns are preferred.

The maximum acceptable pore size is limited by the strength requirements of the refractory particle, and by the practical requirement that the pores should not be readily penetrated by the molten steel and slag after carbon has been deposited therein. If the pores are too large, the strength of the brick becomes too low to be incorporated in a refractory wall. In general, pores having effective diameters up to about 100 microns in diameter have been found most suitable.

The above defined porous grains are formed into carbon-bonded refractories according to the present invention in two major steps. Initially, the pores of the refractory grains are impregnated with elemental carbon; thereafter, the carbon-impregnated grains are mixed with fluid bonding pitch and pressed into bricks at pressures of 5,000–13,000 p.s.i.

The elemental carbon can be incorporated in the porous grains by either of two principal techniques. In the first method, the porous grains are mixed with fluid pitch, tar, or other carbonaceous liquid and absorb the pitch, tar, or carbonaceous liquid within its porous structure. The impregnated grains are then heated to carbonize the absorbed carbonaceous liquid and release the volatiles.

A second method for impregnating the pores with carbon is to pass a hydrocarbon gas in contact with heated porous grains at temperatures above about 700° C. The grains are heated to a temperature sufficiently high to thermally crack the hydrocarbon gas within the pores and to deposit carbon on the inner pore surfaces. Similar techniques for cracking carbon from hydrocarbon gases, e.g. cyclic fluid coking processes, can be used to deposit carbon in the pores of the refractory grains.

Additional carbon can be added within the grains by using these two techniques successively; for example, the carbon cracking operation may be carried out first, followed by pitch impregnation and coking. Further, repeated impregnations can be used to increase the amount of carbon deposited in the pores. For example, several pitch impregnations and coking steps can be employed to add successive layers of carbon in the pores of the refractory grains. It is also possible to add oxidizers to the pitch in order to polymerize its components and increase the final carbon content.

Increased quantities of carbon in the pores of the refractory grains are most desirable; however, it is also important that the inner pore walls be substantially completely coated with residual carbon from the precurser carbonaceous material employed, in order to obtain the high resistance to attack which is characteristic of the presently produced bricks. It is believed that complete coating of the pore walls aids in forming internal sheets or ribbons of carbon which resist penetration by the melt. Both of the aforementioned carbon impregnating techniques are capable of substantially coating the entire pore walls of the refractory grain with carbon, although the pitch impregnation technique is advantageous over hydrocarbon cracking in that higher amounts of carbon are deposited in the pores.

High porosity refractory grains, e.g. periclase having open porosities of from about 25% to about 50%, absorb much more pitch than low porosity refractory grains, e.g. those having porosities at or below about 11%. Most importantly, however, the actual percentage of pitch absorbed compared to theoretical pitch absorption is far greater in grains having high porosities as compared with those of low porosity. This is illustrated by the following comparative runs.

In these runs, 25 grams each of —4 +10 mesh periclase grains having the porosities designated below in Table I were mixed with 25 grams of tar having a specific gravity of 1.155 grams per cc., at room temperature for 5 minutes with a stirring rod. The mixture was then filtered through a filter paper on a Buchner funnel to remove residual tar. The grains were then rolled in absorbent paper to remove residual tar from the surface of the grains. The difference in weight before and after this treatment was considered to be the tar absorption. These results were also checked by determining the loss on ignition at 950° C., and were found to be in substantial agreement. The following results were obtained:

TABLE I

| Grain Type | Percent Porosity | Percent Pitch Absorption [1] | Percent of Theoretical Absorption |
|---|---|---|---|
| Commercial Magnesite | 10.2 | 1.7 | 46.0 |
| Low Porosity Periclase | 11.2 | 1.3 | 31.5 |
| Do | 14.6 | 3.5 | 63.7 |
| High Porosity Periclase | 25.3 | 9.4 | 85.4 |
| Do | 36.0 | 16.2 | 88.3 |
| Do | 46.1 | 26.5 | 95.5 |

[1] Percent by weight of pitch-free grain.

In carrying out the pitch impregnation technique, high porosity grains can be impregnated with pitch having a softening point of 65–70° C. to give a relatively dry mix. The maximum amount of pitch which can be employed to produce a dry-appearing mix for various porosities is given below:

TABLE II

| grain, percent [1]: | (by wt. of grain) |
|---|---|
| 25.3 | 10.0 |
| 36.0 | 16.0 |
| 46.1 | 27.5 |

[1] Grain mix consisted of: 42.0% −4 +10 mesh; 45.2% −10 +30 mesh; 12.8% −30 +60 mesh.

Pitch used for impregnating the refractory grains desirably has a softening point of about 65–70° C., for ease of operation. However, it is also possible to use higher softening point pitches such as those having softening points of from 90–150° C. This is shown in the following:

Pitch and coarse grains (−4 +60 mesh) were heated separately to 60–70° C. above the pitch softening point. The grains were added to the pitch in a beaker and thoroughly mixed for five minutes, with controlled heating. The coarse grains employed had porosities of 46.1, 36.0 and 25.3%. The amount of pitch employed was the maximum amount which gave a relatively dry appearing mix. The pitch-impregnated grains were then air-blown with an air stream having a linear velocity of 3.7 feet per second at 340° C. for 2 hours, and devolatilized of gaseous components by treatment at 1100° C. for 1 hour under nitrogen. In some cases as noted below, multiple impregnations were used in which this procedure was repeated. The following table illustrates the amount of free carbon formed in the grains.

TABLE III

| Initial Grain Porosity (percent) | Number of Impregnations and Pitch Added Per Impregnation [1] | | | | Softening Point of Pitch, °C. | Percent Carbon In Coked Grain |
|---|---|---|---|---|---|---|
| | 1 | 2 | 3 | 4 | | |
| 11.2 | 8 | | | | 65 | 0.9 |
| 25.3 | 10 | | | | 65 | 7.4 |
| 36.0 | 16 | | | | 65 | 9.0 |
| 46.1 | 27.5 | | | | 65 | 16.8 |
| 46.1 | 27.5 | 12 | 6 | 3 | 65 | 24.1 |
| 46.1 | 27.5 | | | | 90 | 15.2 |
| 46.1 | 27.5 | | | | 150 | 17.6 |

[1] Percent by weight of previous total grain.

The data in Table III clearly illustrate that increased carbon contents are obtained with grains having increased porosities. Table III further illustrates that the carbon content of the coked grain is increased with increased number of impregnations.

After the refractory grains have been impregnated with pitch, they are coked to carbonize the pitch. The manner of coking these grains is important in determining the elemental carbon residue. Normally, coking values for pitch-impregnated grains which have been coked in the absence of air are from 40% to 50%. That is, the carbon residue which remains is 40% to 50% of the weight of pitch.

In the present process, the coking values of pitch can be increased by air blowing the pitch-impregnated grains while heating them to temperatures of from about 250° C. to 400° C. The pitch in the grain is converted to a polymerized carbonaceous residue by this treatment but is not freed of all of its volatile content. These volatiles can be removed from the polymerized residue and carbonization of the residue completed by subsequently heating the impregnated grains at temperatures above about 700° C. if desired. Otherwise, both the removal of the volatiles and complete carbonization of the polymerized residue within the grain occurs in the final brick when it is fired-in. In this air blowing technique the grains are maintained at temperatures of from about 250° C. to as high as 400° C. for periods of from about one-half an hour to about four hours; optimum results are obtained at temperatures of from about 270° C. to 340° C. for about 2 hours. The following series of runs illustrates the advantage of the present air blowing technique:

A series of periclase grains having an open porosity of 46%, and having pores with effective diameters of from about 5 microns to about 60 microns were treated with equal amounts of a 65° C. softening point pitch having a normal coking valve of about 45%. The grains employed had the following size distribution:

| Mesh size: | Percent by weight |
|---|---|
| −4 +10 | 26 |
| −10 +30 | 21 |
| −30 +60 | 16 |
| −60 | 37 |

After pitch impregnation, the grains were air-blown with an air stream having a linear velocity of 3.7 ft./sec. (under standard conditions) in a Burrell tube furnace for the various times and temperatures given in Table IV. After air blowing, the grains were heated under nitrogen to 1100° C. to drive off residual volatiles and complete carbonization. The total heat-up period normally took from 2 to 3 hours and the hot grains were then cooled under nitrogen. The free carbon content was determined by the loss of ignition of the treated grains. The results obtained are given in Table IV.

TABLE IV

| Air Blowing Temperature (° C.) | Air Blowing Time (Hrs.) | Percent Free Carbon | Percent of Pitch Coked |
|---|---|---|---|
| No Air Blowing | | 8.18 | 44.6 |
| 270 | 1 | 9.16 | 50.2 |
| 270 | 2 | 10.23 | 57.0 |
| 270 | 3 | 10.85 | 60.8 |
| 270 | 4 | 10.16 | 56.4 |
| 340 | 1 | 9.93 | 55.1 |
| 340 | 2 | 12.02 | 68.2 |
| 340 | 3 | 11.77 | 66.6 |
| 340 | 4 | 11.89 | 67.5 |
| 400 | 1 | 9.71 | 53.7 |
| 400 | 2 | 6.74 | 36.1 |

The above results clearly show that coking of pitch-impregnated grains can be increased from about 45 to 68% by air blowing. The optimum air blowing time depends upon the temperature employed; however, if the air blowing is continued for too long a time, oxidation of the impregnating pitch results and seriously decreases the amount of free carbon residue which remains in the impregnated refractory grain. This is demonstrated in Table IV in which the percent free carbon increased to a maximum as a result of the air blowing treatment, but then decreased as the duration of the air blowing treatment was increased.

In the process of preparing the refractory grains for impregnation, it is customary to crush larger refractory particles to yield a predominantly −4 +60 mesh fraction. This fraction has been found convenient for carbon impregnation and can be handled readily during the pitch impregnation treatment to produce a relatively dry mix of pitch-impregnated grains. This dry mix reduces handling difficulties during carbonization of the pitch within the grains.

The −4 +60 mesh fraction of carbon-impregnated refractory grains may then be mixed with finer refractory particles either impregnated or not, and with a binder pitch, and pressed into bricks to yield bricks of acceptable strength for use in refractory liners. The exact ratio of coarse particles to finer particles is not critical since many different blends of particle sizes are capable of yielding acceptable bricks. However, it has been found that bricks having both a high strength and high density can be made up by employing "gap-sizing" in which about 60% by weight of the total refractory particles is made up of a carbon-impregnated −4 +60 mesh fraction and about 40% is made up of a −200 mesh fines fraction which has not been subject to carbon impregnation. Carbon impregnation of periclase grains smaller than 200 mesh is generally not carried out because these grains have very low capacity for absorbing pitch. This is probably due to the relatively few large open pores which are present in grains of this size. As a result, pitch impregnations are carried out only on the grain fractions coarser than 200 mesh and the −200 mesh refractory fines are employed without a carbon-impregnating pre-treatment step.

The production of fines is unavoidable during grinding of the coarse periclase to obtain a −4 +60 mesh fraction. Thus, this technique permits recovery of substantial portions of periclase fines which otherwise would be unsuitable for carbon impregnation and brick makeup. A typical "gap-sizing" mix contains 26% by weight −4 +10 mesh, 28% by weight −10 +30 mesh, 8% by weight −30 +60 mesh, 0% by weight −60 +200 mesh and 38% by weight −200 mesh.

After the refractory grains have been impregnated with a carbonaceous liquid such as fluid pitch, and the pitch carbonized to elemental carbon (or to a polymerized residue in the case of air-blowing at elevated temperature), the impregnated grains and fines are mixed with predetermined amounts of a bonding pitch and pressed while hot into refractory bricks. The amount of bonding pitch which can be used in making up the refractory bricks is inherently fixed by the brick pressing operation itself. That is, if too little bonding pitch is used with the refractory grains, the mix will be too dry and there will not be adequate binder to form a uniformly bonded brick. On the other hand, if too much bonding pitch is employed, the mixture becomes too wet and sticky for proper handling during the hot brick pressing operation, and will slump on being fired-in.

Advantageously, larger amounts of bonding pitch can be employed in making up the instant refractory bricks with high porosity, carbon-impregnated, periclase grains, than can be used in making up commerical, pitch-bonded bricks from low porosity, unimpregnated, periclase grains. In general, the exact amount of bonding pitch which is required in the instant process depends upon the degree of residual porosity of the impregnated grains—greater amounts of residual porosity permit more bonding pitch to be used. The residual porosity of the impregnated grains, in turn, is regulated by the type of heat treatment which the pitch impregnated grain was subjected to and the degree of volatiles which were removed from the pores of the grains. For example, a grain having an open porosity of 46.1% which is impregnated with pitch, air-blown and subsequently devolatilized at temperatures above 700° C., can be pressed with from about 6 to about 16% by weight of bonding pitch based on the weight of the periclase particles, with about 11% being the optimum. On the other hand, if a brick is made up in exactly the same manner as described above except that the pitch-impregnated grains are merely air-blown without subsequent devolatilization at about 700° C., bonding pitch in amounts of from about 4% to about 15% can be used with only about 8% being the optimum.

In the brick pressing operation, no difficulty is encountered in using the maximum amounts of bonding pitch recited above for making refractory bricks. However, the optimum quantities are generally employed in order to guard against slumping of the brick during the firing-in and to prevent internal cracking of the brick due to the rapid evolution of volatiles. If more than optimum amount of bonding pitch is desired, it generally necessitates a more careful "firing-in" procedure in the converter.

The 6 to 16% range, with an 11% optimum of bonding pitch that can be used in producing bricks by the present invention is in direct contrast with conventional pitch-bonded bricks made up with a maximum of about 8% bonding pitch by weight based on the weight of the refractory aggregate, with 6% being the optimum. Thus, by means of the present invention, the carbon content of the refractory bricks is increased not only by virtue of the carbon which impregnates the pores of the refractory grains, but also because of increased amounts of bonding pitch which can be incorporated within the brick per se.

The mixture of bonding pitch and carbon-impregnated refractory grains, which is normally pressed into refractory bricks, can be used to make up rammed or monolithic liners in the converters. In this application, the mixture is rammed into place to form a refractory shape corresponding to the area which is to be filled or patched. Further, the term "pitch," as used in the present application, is intended to indicate both petroleum-based and coal-based materials and includes both tar distillates and asphalts.

The following examples are given to illustrate the present invention and are not deemed to be limiting thereof.

Example 1

The following procedure was used in making up refractory briquettes. Coarse periclase grains (−4 +60 mesh fraction) having open porosities as set forth in Table V were added to pitch. The effective diameters of the pores in the refractory grains were substantially all above 5 microns but no larger than 100 microns. The pitch was maintained at about 135° C. (70° C. above its softening point) during the 5-minute impregnation period and had the following properties: softening point (cube in water), 66.2; benzene insolubles, 18.0% by wt.; quinoline insolubles, 7.6% by wt.; coke value (Conradson method), 46.3%; distillation characteristics (ASTM D–246) 0–300° C., 4.5%; 0–315° C., 7.2%; 0.340° C., 11.6%; 0–350° C., 21.3%; source—lower boiling fraction from destructive distillation of coal. The resulting impregnated grains, which were relatively dry in appearance, were then air-blown with an air stream at a velocity of 3.7 ft./sec. at 340° C. for 2 hours. After air blowing, the grains were heated under nitrogen to 1100° C. to drive off residual volatiles and carbonize the pitch. The hot grains were then cooled under nitrogen. This same procedure was repeated where more than one impregnation was carried out. The carbon-impregnated grains were heated to about 130° C. and were then added to a pitch binder, having the same properties as the impregnating pitch, heated to 70° C. above its softening point. The coarse impregnated grains were allowed to remain in the pitch for 5 minutes. Thereafter, preheated periclase fines (−200 mesh) were added to the bonding pitch and the mixing was continued for another 5 minutes. The coarse impregnated particles (−4 +60 mesh) were maintained in a weight ratio relative to the fines of 62% to 38% respectively. The resulting mixture was pressed into briquettes in preheated molds at 8000 p.s.i. using the amount of pitch binder set forth in Table V. The briquettes were than carbonized by air blowing at 340° C. for 2 hours followed by heating under nitrogen at 1100° C. to obtain the maximum coking value of the pitch binder. The carbon contents of the resulting briquettes are reported in Table V.

In addition to the above, a second series of briquettes was made up using the same technique except that the final briquettes were not air blown; instead, they were simply heated to 1100° C. under a reducing atmosphere to carbonize the bonding pitch. The carbon content of these briquettes are also reported in Table V.

TABLE V

| Grain "Open Porosity" | Number of Impregnations of Coarse Grain | Percent Pitch Binder [1] | Percent Carbon After Coking [2] | |
|---|---|---|---|---|
| | | | With Air Blowing | Without Air Blowing |
| Commercial Brick | 0 | 5.5 | 2.5 | 2.4 |
| 11.2 | 0 | 8 | 4.6 | 3.5 |
| 25.3 | 1 | 8 | 8.6 | 7.9 |
| 25.3 | 1 | 13 | 10.6 | 9.9 |
| 25.3 | 2 | 13 | 13.1 | 10.8 |
| 36.0 | 1 | 10 | 10.5 | 9.7 |
| 36.0 | 1 | 16 | 12.9 | 11.9 |
| 36.0 | 2 | 16 | 15.9 | 15.0 |
| 46.1 | 1 | 12 | 16.0 | 15.0 |
| 46.1 | 1 | 15 | 16.7 | 16.1 |
| 46.1 | 2 | 8 | 16.2 | 15.2 |
| 46.1 | 2 | 15 | 21.1 | 18.4 |
| 46.1 | 4 | 9 | 19.7 | 18.2 |

[1] Based on weight of total grain without pitch.
[2] Based on weight of total brick.

*Example 2*

A number of sample bricks, 1 inch in diameter by 1¼ inch long were prepared as follows: Coarse periclase grains (−4 +60 mesh) having an open porosity of 46.1% and whose pores had effective diameters within the range of about 5 to about 100 microns, were impregnated with pitch. The pitch was maintained at about 70° C. above its softening point during the addition of the grains to the pitch, and the mixture was allowed to remain for about 5 minutes. The pitch had the following properties: Softening point (cube in water), 66.2; benzene insolubles, 18.0% by weight; quinoline insolubles, 7.6% by weight; coke value (Conradson method), 46.3%; distillation characteristics (ASTM D-246) 0–300° C., 4.5%; 0–315° C., 7.2%; 0–340° C., 11.6%; 0–350° C., 21.3%; source—lower boiling fraction from destructive distillation of coal. Thereafter, the pitch-impregnated grains, which were relatively dry in appearance, were air-blown with an air stream at a velocity of 3.7 ft./sec. at 340° C. for 2 hours. After air blowing, the grains were heated under nitrogen to 1100° C. to drive off residual volatiles. The hot grains were then cooled under nitrogen. Different samples were made up in which grains were impregnated from one to four times using this same procedure. The carbon-impregnated grains were then heated to about 130° C. and were added to a pitch binder having the same properties as the impregnating pitch, heated to 70° C. above its softening point. Thereafter, preheated periclase fines (−200 mesh) were added to the bonding pitch and mixed for ten minutes. The coarse impregnated particles (−4 +60 mesh) were maintained in a weight ratio, relative to the fines, of 62% to 38% respectively. The resulting mixture was pressed into bricks in heated molds at 8000 p.s.i. with 8.5% by weight of bonding pitch, based on the weight of the refractory particles. The pitch in the bricks was carbonized by air blowing the bricks with an air stream at temperatures of about 320–340° C. at 3.7 ft./sec. for 2 hours followed by heating under nitrogen at 1100° C. to obtain maximum coking values of the pitch binder.

All of the brick samples were then immersed to their mid points into a synthetic converter slag maintained in the combustion atmosphere at a temperature of 1650° C. for a period of 15 minutes. The brick samples were then removed and subjected to examination. The synthetic converter slag was made up of

| | Percent |
|---|---|
| CaO | 42 |
| $SiO_2$ | 33 |
| $Fe_2O_3$ | 12.4 |
| MnO | 5.8 |
| MgO | 4.3 |
| $TiO_2$ | 1.4 |
| $P_2O_5$ | 0.8 |
| $Al_2O_3$ | 0.3 |

The results of the slag immersion are reported in Table VI.

*Example 3*

Coarse periclase grains, identical with those employed in Example 2, were impregnated once with pitch having a softening point (cube in water) of 90° C. A second sample was impregnated twice with pitch having a softening point (cube in water) of 150° C. These pitches were derived from the same source as the pitch employed in Example 2, except that they were higher boiling fractions from the destructive distillation of coal. These samples were air-blown and carbonized in the manner set forth in Example 2. The grains were then mixed with fines and pressed into bricks using a pitch binder having a softening point of 66.2° C. in the amount of 15–16% by weight of the refractory particles in the manner of Example 2. The bricks were then air-blown, carbonized, and immersed in a synthetic converter slag as set forth in Example 2. The results of the slag immersion are reported in Table VI.

*Example 4*

Periclase grains having the same characteristics as the grains in Example 2 except that the open porosity was 36.0, were impregnated twice with pitch having a softening point of 66.2° C. in the same manner as described above. The grains were then air-blown and carbonized in the manner described in Example 2. They were then mixed with fines and pressed into bricks using a pitch having the same properties as the impregnating pitch in the manner of Example 2. The amount of pitch used was 16% by weight of the refractory particles. The bricks were then air-blown, carbonized and immersed in a synthetic converter slag as set forth in Example 2. The results of the slag immersion are reported in Table VI.

*Example 5*

Periclase grains having the same characteristics as the grains in Example 2 except that the open porosity was 25.3, were impregnated once with the pitch having a softening point of 66.2° C. The grains were then air-blown and carbonized in the manner described above in Example 2. They were then mixed with fines and pressed into bricks using a pitch having the same properties as the impregnating pitch in the manner of Example 2. The amount of pitch used was 13% by weight of the refractory particles. The bricks were then air-blown, carbonized and immersed in a synthetic converter slag as set forth in Example 2. The results of the slag immersion are reported in Table VI.

Example 6

The following procedure was used in making up refractory bricks 9½ x 4½ x 2½ inches.

Preheated coarse periclase grains (−4 +60 mesh) having open porosities of 46.1% and whose pores had effective diameters within the range of 5 to about 100 microns were impregnated with pitch. The pitch had a softening point of 66.2° C. and was maintained at about 135° C. (70° C. above its softening point) during the 10-minute impregnation period. Thereafter, the impregnated grains, which were relatively dry in appearance, were air-blown with an air stream at temperatures of about 320–340° C. for 2 hours and subsequently cooled in air. After air blowing, the impregnated grains were heated to about 130° C. and were added to bonding pitch having a softening point of 66.2° C. which was heated to 70° C. above the softening point. Thereafter, preheated periclase fines (−200 mesh) were added to the bonding pitch and the entire mixture stirred for about 10 minutes. The coarse impregnated particles (−4 +60 mesh) and the periclase fines (−200 mesh) were maintained in a weight ratio of 62% to 38% respectively. The resulting mixture was pressed into briquettes in preheated molds at 6400 p.s.i. using bonding pitch in the amount of 8% by weight of the total refractory particles. A 2½ x 2½ x 1½ inch specimen was cut from the bricks, and air-blown and carbonized at 1100° C. under nitrogen as described in Example 2. The specimen was tested for resistance to slag attack as described in Example 2. The results of the slag immersion are reported in Table VI.

PRIOR ART PRACTICE

*Sample A.*—Periclase grains (−4 +60 mesh) having an open porisity of 11.2% were blended with molten pitch having a softening point of 66.2° C. The mixture was pressed into a brick in preheated molds at about 8000 p.s.i., using 8% pitch by weight of the periclase grain. This is the conventional prior art procedure for producing tar-bonded refractory bricks. The low porosity grains were not subjected to the carbon impregnation step of the present invention prior to pressing with the final pitch binder into the finished brick.

*Sample B.*—An additional sample was cut from a commercially available pitch-bonded periclase brick having a grain porosity below about 10% so that its outer dimensions conformed to the brick samples previously made.

Both Sample A and Sample B bricks were then subjected to air blowing at 340° C. for 2 hours as set forth in Example 2 followed by carbonization at 1100° C. for 1 hour under nitrogen. The resultant bricks were immersed in a synthetic converter slag as set forth in Example 2. The results of this slag immersion are reported in Table VI.

Example 7

A bed of coarse periclase grains (−4 +65 mesh) having an open porosity of 46.1% and whose pores had effective diameters of from about 5 microns to about 60 microns, was heated in an electrically heated reactor to 1000° C. in a nitrogen atmosphere. Methane was then passed upward through the bed for a period of 1 hour while maintaining the temperature of the reactor at 1000° C. The methane was cracked at this temperature and deposited elemental carbon in the pores of the grains. The total carbon content of the grains after treatment was 3.1% by weight, based on the weight of the methane cracked particles.

The carbon containing grains were then added to pitch having a softening point of 66.2° C. The pitch was maintained at about 70° C. above its softening point during the 5-minute impregnation period. The impregnated grains were then removed and were air-blown with an air stream at a velocity of 3.7 ft./sec. at 340° C. for 2 hours. After being air-blown, the grains were heated under nitrogen to 1100° C. to drive off residual volatiles. This procedure was repeated to obtain a second carbon impregnation. The coarse impregnated grains (−4 +65 mesh), which contained 27.3% carbon, and periclase fines (−200 mesh) were mixed with a pitch binder having a softening point of 66.2° C. The fines were present in the amount of 38% by weight of the total refractory particles and the pitch binder was present in the amount of 15% of the total refractory particles. The hot mixture was compressed into bricks and the bricks were air-blown at 340° C. for 2 hours followed by a devolatilization at 1100° C. under nitrogen. The resulting bricks contained 28.2% by weight carbon based on the weight of the total brick.

In this example, the use of both a hydrocarbon cracking technique and a pitch impregnation step appears to yield the highest amount of carbon impregnation of the grains. The amount of pitch absorbed, in many cases, is above the theoretical amount of pitch which can be absorbed in 46.1% open porosity grain. It is believed that this is made possible because the pores are enlarged during the hydrocarbon cracking step and because the carbon deposited on the inner surface of the pores may permit improved wetting and impregnation by the pitch.

In general, where the hydrocarbon cracking technique has been employed to impregnate the refractory grains, amounts of carbon ranging from about 7 to about 27% by weight of the non-impregnated refractory grains can be deposited; the subsequent bricks, made by compressing these impregnated refractory grains with a bonding pitch and carbonizing the pitch, may have carbon contents of from 5 to 28% by weight of the refractory brick. However, where impregnation of the refractory grain is accomplished only by pitch impregnation and subsequent

TABLE VI

| Example | Run | Open Porosity of Original Grain | Number of Impregnation | Softening Point of Impregnating Pitch, °C. | Percent of Bonding Pitch | Slag Penetration | Corrosion | Remarks |
|---|---|---|---|---|---|---|---|---|
| 2 | 1 | 46.1 | 1 | 66.2 | 8.5 | Very slight | None | Exterior dimensions of the bricks in Examples 2, 3, 4 and 6 remained unchanged, except for a very slight, uniform reduction in diameter throughout the entire sample. No difference in result was seen in the resistance to slag attack or corrosion by the bricks in these various examples. In Example 5, slight slag penetration was observable but it was not considered objectionable under these test conditions. |
| 2 | 2 | 46.1 | 2 | 66.2 | 8.5 | ___do___ | ___do___ | |
| 2 | 3 | 46.1 | 3 | 66.2 | 8.5 | ___do___ | ___do___ | |
| 2 | 4 | 46.1 | 4 | 66.2 | 8.5 | ___do___ | ___do___ | |
| 3 | 1 | 46.1 | 1 | 90 | 15.5 | ___do___ | ___do___ | |
| 3 | 2 | 46.1 | 2 | 150 | 15.5 | ___do___ | ___do___ | |
| 4 | | 36.0 | 2 | 66.2 | 16 | ___do___ | ___do___ | |
| 5 | | 25.3 | 1 | 66.2 | 13 | Slight | Slight | |
| 6 | | 46.1 | 1 | 66.2 | 8 | Very slight | None | |
| Prior Art | | | | | | | | |
| Sample A | | 11.2 | None | | 8 | Severe | Severe | Severe decrease in the diameter (necking) of brick at slag level. |
| Sample B | | (¹) | None | | 6 | ___do___ | ___do___ | Do. |

¹ Below 10%.

carbonization, amounts of carbon ranging from about 7 to 25% by weight of the non-impregnated refractory grains are normally deposited; the subsequent bricks, made by compressing these impregnated refractory grains with a bonding pitch and carbonizing the pitch, have carbon contents of from about 5 to 25% by weight of the refractory brick.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise that, as specifically described and exemplified herein.

What is claimed is:

1. Process for producing pitch-bonded refractories with increased resistance to oxidation and corrosion which comprises
   (a) impregnating refractory grains having an open porosity of from about 25% to about 50% with carbon, said carbon being present in amounts of from about 7 to about 27% by weight of the non-impregnated refractory grains,
   (b) intimately mixing said carbon impregnated refractory grains with from about 6 to about 16% by weight of a bonding pitch, based on the weight of the refractory particles, and
   (c) compressing said mixture of carbon impregnated refractory grains and bonding pitch into refractory shapes in which the total carbon content of the refractory shapes, upon carbonization of the bonding pitch, is from about 5 to about 25% by weight of the refractory shape.

2. Process of producing pitch-bonded refractories with increased resistance to oxidation and corrosion which comprises
   (a) impregnating the pores of porous refractory grains with a carbonaceous liquid,
   (b) air-blowing the carbonaceous liquid-containing refractory grains for periods from about ½ to about 4 hours at temperatures of from about 250 to 400° C. to convert said carbonaceous liquid to a polymerized carbonaceous residue, said residue containing carbon in amounts of from about 7 to about 27% by weight of the non-impregnated refractory grains,
   (c) intimately mixing the resulting impregnated refractory grains with from about 4 to about 15% by weight of a bonding pitch, based on the weight of the refractory particles, and
   (d) compressing said mixture of impregnated refractory grains and bonding pitch into refractory shapes in which the total carbon content of the refractory shapes, upon carbonization of the bonding pitch and polymerized carbonaceous residue, is from about 5 to about 25% by weight of the refractory shape.

3. Process for producing a pitch-bonded refractory brick with increased resistance to oxidation and corrosion which comprises
   (a) impregnating refractory grains having an open porosity of from about 25% to about 50% with a liquid pitch,
   (b) carbonizing said pitch in the pores of said refractory grains by heating said grains, said grains containing from about 7 to about 27% by weight of carbon based on the non-impregnated refractory grains,
   (c) intimately mixing the resulting carbon impregnated refractory grains with from about 6 to about 16% by weight of a bonding pitch, based on the weight of the refractory particles, and
   (d) compressing said mixture of carbon impregnated refractory grains and pitch into bricks in which the total carbon content of the bricks, upon carbonization of the bonding pitch, is from about 5 to about 25% by weight of the refractory brick.

4. Process of claim 3 in which the pitch in the refractory grains is carbonized by heating to temperatures of above about 700° C.

5. Process of claim 3 in which substantially all the pores of said refractory grains have effective diameters of from about 5 to about 100 microns.

6. Process of claim 2 in which the air blowing is carried out at temperatures of from about 270–340° C. for a period of about 2 hours.

7. Process of producing pitch-bonded refractories with increased resistance to oxidation and corrosion which comprises
   (a) impregnating refractory grains having an open porosity of from about 25 to about 50% with carbon by passing a hydrocarbon gas in contact with said refractory grains at a temperature sufficient to crack the hydrocarbon gas and deposit elemental carbon in the pores of said grains, said elemental carbon being present in amounts of from about 7 to about 27% by weight of the non-impregnated refractory grains,
   (b) intimately mixing said carbon impregnated refractory grains with a bonding pitch, and
   (c) compressing said mixture of carbon impregnated refractory grains and pitch into refractory shapes in which the total carbon content of said refractory shapes, upon carbonization of the bonding pitch, is from about 5 to about 28% by weight of the refractory shape.

8. Process of claim 7 wherein the refractory grains are maintained at cracking temperatures of at least about 700° C.

9. Process for producing a pitch-bonded refractory brick with increased resistance to oxidation and corrosion which comprises
   (a) impregnating refractory grains having an open porosity of from about 25 to about 50%, and whose pores have an effective diameter of from about .5 to 100 microns, with a liquid pitch,
   (b) carbonizing said pitch in the pores of said refractory grains by heating said grains, said grains containing from about 7 to about 27% by weight of carbon based on the non-impregnated refractory grains,
   (c) intimately mixing the resulting carbon impregnated refractory grains and a minor amount of refractory fines with from about 6 to about 16% by weight of a bonding pitch, based on the total weight of said grains and refractory fines, said bonding pitch having a softening point of from about 65° C. to about 150° C., and
   (d) compressing said mixture of carbon impregnated refractory grains, refractory fines and pitch into bricks in which the total carbon content of the bricks, upon carbonization of the bonding pitch, is from about 5 to about 25% of the total refractory brick.

10. Process of claim 9 in which said refractory grains and said refractory fines are present in a weight ratio of about 60% to about 40% by weight respectively, and in which said bonding pitch is employed in the amount of about 8% to 11% and has a softening point of about 65° C.

11. A refractory composition consisting essentially of porous refractory grains, elemental carbon impregnating the pores of said refractory grains, and a pitch binder binding said refractory grains together, said refractory grains having prior to impregnation an open porosity of from about 25 to about 50%, the impregnated pores of said refractory grains having at least their inner surfaces coated with said elemental carbon, said carbon being present in amounts of from about 7 to about 27% by weight of the non-impregnated refractory grains, and in which the total carbon content of the composition, upon carbonization of the bonding pitch, is from about 5 to about 28% by weight of the refractory composition.

12. Composition of claim 11 in which the refractory grains contain at least 95% by weight of magnesium oxide, not more than 4% silicon dioxide, and in which the pores of said refractory grains have effective diameters of from about 5 to about 100 microns.

13. A refractory composition consisting essentially of porous refractory grains, a polymerized carbonaceous residue impregnating the pores of said refractory grains, and a pitch binder binding said refractory grains together, said refractory grains having prior to impregnation an open porosity of from about 25% to about 50%, the impregnated pores of said refractory grains having at least their inner surfaces coated with said polymerized carbonaceous residue, said residue containing carbon in amounts of from about 7 to about 27% by weight of the non-impregnated refractory grains, and in which the total carbon content of the composition upon carbonization of the bonding pitch and polymerized carbonaceous residue, is from about 5 to about 25% by weight of the refractory composition.

14. Composition of claim 13 in which the refractory grains contain at least 95% by weight of magnesium oxide, not more than 4% silicon dioxide, and in which the pores of said refractory grains have effective diameters of from about 5 to about 100 microns.

15. A refractory composition consisting essentially of carbon impregnated, particulate, refractory grains, said grains having prior to impregnation an open porosity of from about 25 to about 50%, in which the impregnated pores of said refractory grains have at least their inner surfaces coated with elemental carbon, and in which the total carbon content of the grains is from about 7% to about 27% by weight of the non-impregnated refractory grains.

16. Composition of claim 15 in which the refractory grains contain at least 95% by weight of magnesium oxide, not more than 4% silicon dioxide, and in which the pores of said refractory grains have effective diameters of from about 5 to about 100 microns.

17. A refractory composition consisting essentially of particulate refractory grains impregnated with polymerized carbonaceous residue, said grains having prior to impregnation an open porosity of from about 25 to about 50%, in which the impregnated pores of said refractory grains have at least their inner surfaces coated with said polymerized carbonaceous residue, said residue containing carbon in amounts of from about 7 to about 27% by weight of the non-impregnated refractory grains.

18. Composition of claim 17 in which the refractory grains contain at least 95% by weight of magnesium oxide, not more than 4% silicon dioxide, and in which the pores of said refractory grains have effective diameters of from about 5 to about 100 microns.

References Cited by the Examiner

UNITED STATES PATENTS

| 2,487,581 | 11/1949 | Palumbo | 106—56 |
| 3,111,415 | 11/1963 | Metz | 106—58 |

TOBIAS E. LEVOW, *Primary Examiner.*

HELEN M. McCARTHY, *Examiner.*

SAMUEL H. BLECH, J. POER, *Assistant Examiners.*

UNITED STATES PATENT OFFICE
CERTIFICATE OF CORRECTION

Patent No. 3,265,513　　　　　　　　　　　　　　August 9, 1966

William A. Tidridge et al.

It is hereby certified that error appears in the above numbered patent requiring correction and that the said Letters Patent should read as corrected below.

Column 5, line 34, Table II, the heading to the left-hand column, for "grain, percent[1]:" read -- Porosity of periclase grain percent[1]: --; same Table II, the heading to the right-hand column, for "(by wt. of grain)" read -- Percent Pitch (by wt. of grain) --; column 6, line 38, for "valve" read -- value --; column 7, line 69, for "in" read -- In --; column 8, line 20, for "If more than" read -- If more than the --.

Signed and sealed this 22nd day of August 1967.

(SEAL)
Attest:

ERNEST W. SWIDER　　　　　　　　　　　　　　EDWARD J. BRENNER
Attesting Officer　　　　　　　　　　　　　　　　Commissioner of Patents